US006862029B1

United States Patent
D'Souza et al.

(10) Patent No.: US 6,862,029 B1
(45) Date of Patent: Mar. 1, 2005

(54) COLOR DISPLAY SYSTEM

(75) Inventors: Henry M. D'Souza, Cypress, TX (US); William H. Nott, Spring, TX (US); Gokalp Bayramoglu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/362,080

(22) Filed: Jul. 27, 1999

(51) Int. Cl.$^7$ .......................... G09G 5/10; H04N 17/00
(52) U.S. Cl. .................. 345/690; 345/207; 345/11; 345/22; 345/27; 348/177; 348/655
(58) Field of Search ............................ 345/11, 22, 27, 345/207, 690, 589, 600, 153, 199; 348/177, 179, 181, 182, 189–191, 655, 658, 184–186; H04N 17/00, 9/73; G09G 5/00, 5/10

(56) References Cited

U.S. PATENT DOCUMENTS

| | | | |
|---|---|---|---|
| 4,379,292 A | * | 4/1983 | Minato et al. .............. 345/154 |
| 4,385,259 A | * | 5/1983 | Chase et al. ............ 315/368.12 |
| 4,386,345 A | * | 5/1983 | Narveson et al. ............. 345/22 |
| 4,843,573 A | * | 6/1989 | Taylor et al. ................ 345/431 |
| 4,857,899 A | | 8/1989 | Ishii ........................... 340/701 |
| 4,875,032 A | | 10/1989 | McManus et al. |
| 4,989,072 A | * | 1/1991 | Sato et al. ................... 348/180 |
| 5,070,413 A | | 12/1991 | Sullivan et al. ............. 358/456 |
| 5,115,229 A | * | 5/1992 | Shalit ............................. 345/1 |
| 5,276,458 A | * | 1/1994 | Sawdon ...................... 345/132 |
| 5,311,294 A | | 5/1994 | Cromer et al. |
| 5,384,901 A | | 1/1995 | Glassner et al. ............ 395/131 |
| 5,406,310 A | | 4/1995 | Aschenbrenner et al. ... 345/150 |
| 5,479,186 A | | 12/1995 | McManus et al. ............ 345/11 |
| 5,510,851 A | * | 4/1996 | Foley et al. ................. 348/658 |
| 5,512,961 A | | 4/1996 | Cappels, Sr. |
| 5,561,751 A | | 10/1996 | Wong ......................... 395/131 |
| 5,602,567 A | * | 2/1997 | Kanno ......................... 345/132 |
| 5,638,117 A | | 6/1997 | Engeldrum et al. |
| 5,652,831 A | | 7/1997 | Huang et al. ................ 395/131 |
| 5,691,741 A | * | 11/1997 | Kerigan et al. ............. 345/112 |
| 5,740,076 A | | 4/1998 | Lindbloom ............. 364/514 R |
| 5,754,222 A | | 5/1998 | Daly et al. .................. 348/184 |
| 5,821,917 A | | 10/1998 | Cappels ...................... 345/150 |
| 5,926,617 A | | 7/1999 | Ohara et al. ................ 395/109 |
| 5,956,015 A | | 9/1999 | Hino .......................... 345/153 |
| 6,075,888 A | | 6/2000 | Schwartz .................... 382/167 |
| 6,108,053 A | * | 8/2000 | Pettitt et al. ................ 348/180 |
| 6,243,059 B1 | * | 6/2001 | Greene et al. ................ 345/88 |
| 6,285,349 B1 | * | 9/2001 | Smith ......................... 345/204 |
| 6,388,648 B1 | * | 5/2002 | Clifton et al. ................ 345/88 |

FOREIGN PATENT DOCUMENTS

| | | |
|---|---|---|
| EP | 0313795 A1 | 5/1989 |
| WO | WO 00/29935 | 5/2000 |

OTHER PUBLICATIONS

International Electrotechnical Commission, *Colour Measurement and Management in Multimedia Systems and Equipment*, 19 pgs., (Jan. 9, 1998).

(List continued on next page.)

Primary Examiner—Alexander Eisen

(57) ABSTRACT

Disclosed is a method and apparatus for controlling color displayed on a color monitor. The method includes, in one embodiment, the steps of: activating a first color scheme on the monitor; responsive to the activating of the first color scheme, measuring a first color point of the monitor; storing the first color point within a memory associated with the monitor; activating a second color scheme on the monitor; responsive to the activating of the second color scheme, measuring a second color point of the monitor; storing the second color point within the memory associated with the monitor; activating a third color scheme on the monitor; responsive to the activating of the third color scheme, measuring a third color point of the monitor; and storing the third color point within the memory associated with the monitor.

13 Claims, 3 Drawing Sheets

OTHER PUBLICATIONS

Compaq Computer Corporation, *Crayola Color Project, Correct Internet Color Project Update and Forward Action Plan*, 28 pgs., (Jan. 3, 2001).

Video Electronics Standards Association (VESA®), *Extended Display Identification Data(EDID™)Standard*, 28 pgs., (©1996 VESA).

Charles Poynton, *Frequently Asked Questions about Color*, http://www.inforamp.net/~poynton/notes/colour_and_gamma/ColorFAQ.html#RTFToC; 24 pgs., (Dec. 30, 1999).

Charles Poynton, *Frequently Asked Questions about Gamma*, http://www.inforamp.net/~poynton/notes/colour_and_gamma/ColorFAQ.html#RTFToC; 13 pgs., (Dec. 30, 1999).

*Web Color Calibration Issues*, by Lynda Weinman, http://www.webtechniques.com/archives/1998/11/desi/; Oct. 31, 2000, 7 pgs.

*An Overview of Technology, Benefits and Opportunities of True Internet Color*, E–Color™, Rev.080800dta, 11 pgs.

\* cited by examiner

COLOR DISPLAY SYSTEM

CROSS-REFERENCE TO RELATED APPLICATIONS

Not Applicable.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to color monitors and displays, and more particularly the present invention relates to calibrating and standardizing the output of a color display device.

2. Description of the Related Art

The currently accepted method of characterizing the input-output of an analog RGB color CRT monitor is to assume that the input voltage to the monitor is related to the output brightness of the monitor by a "gamma" function. The gamma function is utilized to define the relationship between the input voltage and the output brightness of the monitor. The brightness of the monitor should be equal to a constant multiplied by the input voltage raised to the power of gamma. Gamma is a rational number between zero and infinity which is provided by a monitor's manufacturer and is based on measurements made by the manufacturer. Via experimental observation, it has been determined that the gamma function, though the standard in the industry, is inaccurate. The gamma function can provide an error that can exceed 4 foot-lamberts over the full brightness range of the monitor; the gamma number is generally an estimation by the CRT's manufacturer based on empirical measurements on a specific monitor and then averaged or generalized for all similar monitors.

Furthermore, color monitors generally generate a color picture via a brightness mixture of red, green and blue. Since red, green and blue are generated by separate circuits, the gamma function for each should be different. To date, only a single gamma is used for all three colors.

The importance of accurate color is becoming of paramount importance in the computer monitor industry. The need for and importance of accurate color has come about, to some degree, due to the increased amount of commerce taking place on the World Wide Web or Internet. For example, an Internet site might sell clothing. The site owner would like the correct color of the clothing to be displayed on the viewer's monitor so that the viewer will have better confidence when buying the product. At present, the gamma function will not necessarily allow the potential buyer to view the correct color of the clothing. This is a significant problem in the area of standardizing the color in a color display device.

Thus, there is a need for a method of providing a color monitor or color display device the ability to correctly and accurately display the color(s) that should be displayed. Furthermore, there is a need for providing a color monitor that utilizes more than the single gamma number in order to predict and provide a brightness output that is characterized by a standardized signal input-brightness output characteristic. Furthermore, what is needed is a method and apparatus for characterizing each color channel of a color monitor separately in order to enhance color fidelity of a color display device. Also, there is a need for a color display device that stores its own input-to-output brightness characteristics.

BRIEF SUMMARY OF THE INVENTION

An exemplary embodiment of the present invention may comprise a photometer and video pattern generator that are interfaced to a computer system. The computer system may be equipped with a means to write to a non-volatile memory within a color display device. A color display device is tested by placing the photometer in front of the display device under test. The computer controls the pattern generator so as to drive the display with incremental input signals corresponding to an output display color. For each incremental input from the pattern generator, the photometer measures the actual brightness output of the color on the color display device and provides the measurement to the computer for storage in a memory device. This is done for each color; red, green and blue, from a maximum brightness to a minimum brightness. After recording all the input signal-to-brightness information for each color, the computer computes coefficients for a third order polynomial for each color channel that best represents the correlation between the incremental inputs and the resulting brightness measurements for each color. In effect, a transfer function is created describing the signal-input-to-brightness-output characteristics for each color. The transfer function can be a third order polynomial equation. The computed coefficients for the third order polynomial for each color (12 coefficients, 4 for each color red, green and blue) can then be provided to and stored in a non-volatile memory within the display device. The coefficients can then be utilized by display driver circuitry within a computer to which the tested display device is connected. The display driver can utilize the coefficients to help provide an accurate high color fidelity, standardized picture on the monitor.

BRIEF DESCRIPTION OF THE SEVERAL VIEWS OF THE DRAWINGS

Various objects and advantages of this invention will become apparent and more readily appreciated from the following description of the presently preferred exemplary embodiments, taken in conjunction with the accompanying drawings, of which.

DETAILED DESCRIPTION OF THE INVENTION

An exemplary embodiment of the present invention prescribes a method for establishing a transfer function, and preferably, a third order polynomial that describes a relationship between an input to a color monitor and the resulting color brightness of the monitor for each color red, green and blue. In essence, a polynomial representation of the input-output characteristics of a color display device is established.

Figure 1:
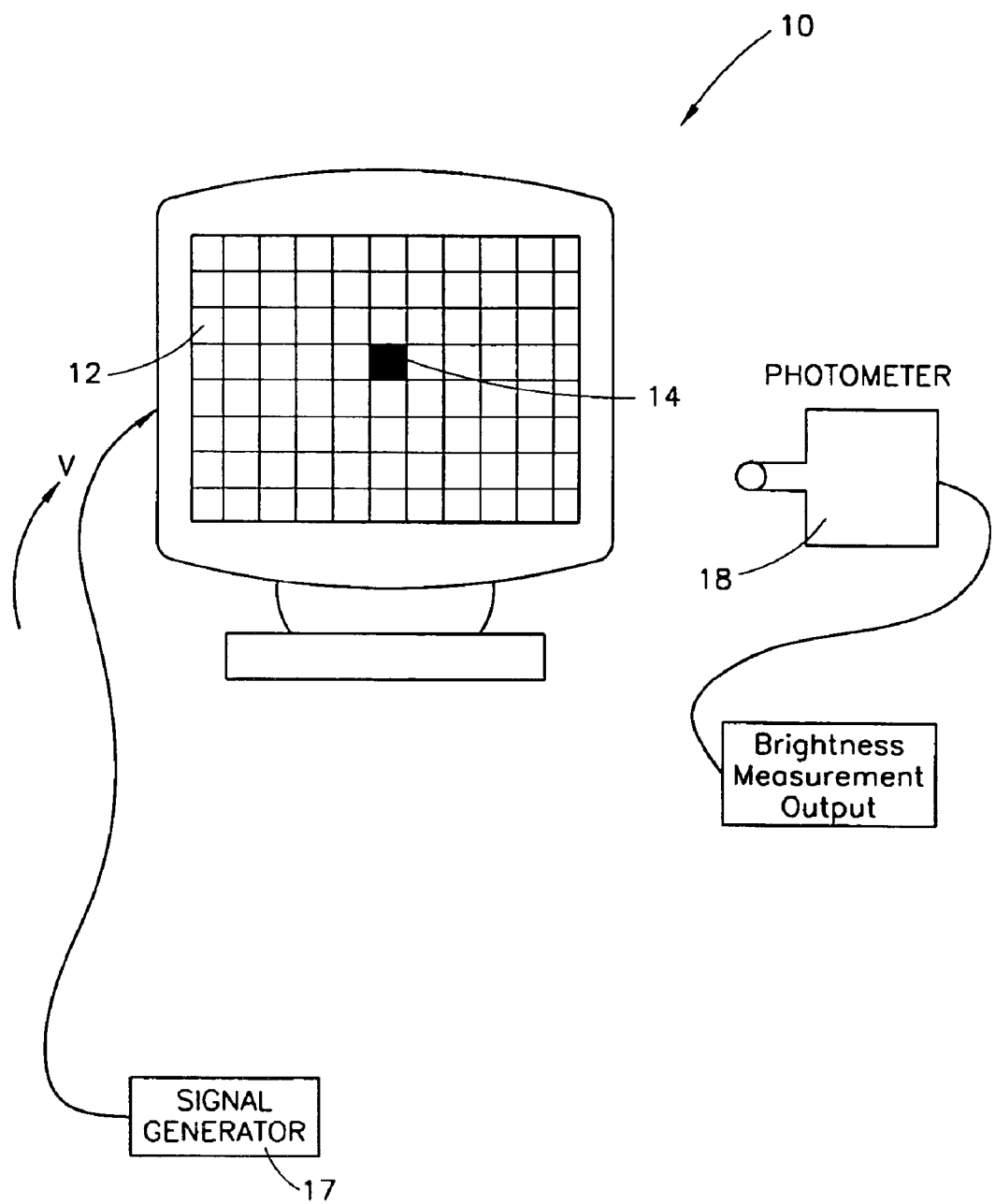
FIG. 1 depicts an exemplary color monitor with an exemplary pixel pattern on the screen.

Referring to FIG. 1, a CRT 10 is depicted. It is noted that this method can be used for substantially any display device. Such display devices include, but are not limited to, color display devices, VGA flat panel NCDs or SPVs, LCD, reflective LCD, and FED display devices. Regardless, of the type of color display device 0, a video signal (or its equivalent) is inputted into the color display device (CDD) 10 and a pattern is outputted on the CDD's screen. A grid or plurality of pixels 12 make up the displayed pattern. A pixel is a picture element or an addressable element within the displayed image on the CDD's screen.

To simplify, a single pixel 14 can be addressed or illuminated as a result of an input to the CDD 10. The pixel may represent red, blue, or green, or another color used as a pixel on the CDD.

Again, a pixel is essentially an element of a CDD's picture. A CDD's screen is substantially a grid of pixels to some extent. Focusing, for a moment on a single pixel 14 in an exemplary CDD 10, it is desirable to determine an accurate transfer function that describes the relationship between a voltage input to the CDD 10 and a resulting brightness of the pixel 14.

The present exemplary method of representing the brightness output of a CDD pixel 14 at any given voltage level input, via a signal generator 16, is provided as a polynomial expression. A polynomial expression is chosen because it can provide a more accurate transfer function than the prior art gamma function technique.

In the preferred method and apparatus of the present invention, a third order polynomial transfer function is utilized. It is understood that a second order or higher polynomial could be used depending on how precise a transfer function is required. After various tests, it was established in the lab that a third order polynomial can be utilized to provide a transfer function with an accuracy of better than 0.3 foot-lamberts over the full range of brightness. This accuracy is not significantly noticeable to the human eye. It is noted that use of the prior art gamma function can generally have an inaccuracy of 3 or more foot lamberts which is easily noticed by the human eye.

To calculate the third order polynomial a least squares technique, which is a well known mathematical technique, is preferably utilized. The third order polynomial transfer function utilized in the present invention and method provides approximately a ten fold increase in accuracy over the prior art gamma function.

The signal generator 16 provides a video signal or other required input signal to the CDD 10 and a visible output pattern is provided on the screen 12 of the CDD. The pattern may include one or more pixels 14 and preferably is in a single color such as red, blue or green. In order to establish a polynomial transfer function, one must look at the brightness of the pixel 14 as a function of the video signal (the input signal). In other words the pixel 14 has a brightness B which is related to an input voltage V. B=f(V). The brightness B of the pixel 14 must be known to be when the input voltage to the CDD 10 changes. To make the relationship between B brightness and V voltage a third order polynomial relationship the equation $$B = a_3 V^3 + a_2 V^2 + a_1 V + a_0$$

is utilized. The voltage input is systematically changed from a minimum voltage input to a maximum voltage input in an incremental fashion. Thus, mathematically the voltage is incrementally applied from the signal generator 16 to the CDD 10:

$V \rightarrow V_{min}$ to $V_{max}$ in increments of $\Delta$ such that $V_1 = V_{min}$ and $V_{max} = V_N$ $$V_n - V_{n-1} = \Delta$$

The resulting brightness B for each voltage increment will be:

$$B_1, B_2, B_3 \ldots B_N \text{ for } V_{min} \text{ to } V_{max}$$

wherein $B_1$ is the minimum output brightness; $B_N$ is the maximum output brightness, $B_{n-1}$ is equal to the brightness differential between each brightness increment.

Input voltage $V_n$ is applied for each voltage increment between $V_{min}$ and $V_{max}$ and the resulting $B_n$ is measured via, for example, a photometer 18. $B_n$ is represented as a brightness measurement output of the photometer 18. The unit of measurement for brightness is preferably foot lamberts.

The increment ($\Delta$) for the voltage can be, for example, 0.5 volts or any reasonable voltage increment that provides a good sampling of voltage inputs to brightness outputs. Thus, input/output data can be established.

$$V_1 \rightarrow B_1$$
$$V_2 \rightarrow B_2$$
$$\vdots \quad \vdots$$
$$V_n \rightarrow B_n$$
$$V_{max} \rightarrow B_{max}$$

This can be rewritten as a plurality of polynomial equations and, in particular, a plurality of third order polynomial equations:

$$B_1 = a_3 V_1^3 + a_2 V_1^2 + a_1 V_1 + a_0$$
$$B_2 = a_3 V_2^3 + a_2 V_2^2 + a_1 V_2 + a_0$$
$$\vdots \quad \vdots \quad \vdots \quad \vdots \quad \vdots$$
$$B_{max} = a_3 V_n^3 + a_2 V_n^2 + a_1 V_n + a_0$$

Each $B_n$ and $V_n$ are known quantities and thus, the polynomial only needs to be solved for $a_3$, $a_2$, $a_1$, and $a_0$. Furthermore, it is understood that generally the increments between each $B_n$ are not equal or necessarily linear. The equation has only four unknowns ($a_3$, $a_2$, $a_1$, and $a_0$) and the process of creating the equations will produce many more than four equations thereby making this an over determined system. An over determined system can produce, mathematically, very accurate values for the coefficients $a_3$, $a_2$, $a_1$, and $a_0$.

The plurality of equations can be solved a variety of ways using a variety of techniques known to those having ordinary skill in the art. One technique is to use matrix techniques to solve for the coefficients $a_3$, $a_2$, $a_1$, and $a_0$.

$$\begin{bmatrix} B_1 \\ B_2 \\ \vdots \\ B_N \end{bmatrix} = [a_3 a_2 a_1 a_0] \begin{bmatrix} V_1^3 & V_3^3 & \ldots & V_N^3 \\ V_1^3 & V_3^3 & \ldots & V_N^3 \\ V_1 & V_3 & \ldots & V_N \\ 1 & 1 & \ldots & 1 \end{bmatrix}$$

Once the equation is solved for the coefficients $a_3$, $a_2$, $a_1$ and $a_0$, then a sufficiently accurate transfer function is established which can predict a brightness B for any input voltage V applied to the CDD 10. The brightness has been empirically determined to be accurate to within approximately ±0.3 foot-lamberts if a third order polynomial is utilized.

The above method can be repeated for each color red, blue and green thereby providing four coefficients $a_3$, $a_2$, $a_1$, and $a_0$ for each color, totaling 12 coefficients in all. That is, four coefficients for red, four for green, and four for blue. Theoretically, one could average or compress each set of four numbers and only have three numbers (one number for each red, green and blue). Also one could average all the $a_0$s to produce a single $A_0$ for red, green, and blue. Then similarly average all the $a_1$s and $a_2$s and $a_3$S to produce only four coefficient numbers for each transfer function. The $a_0$ coefficient could be dropped and not used when it is an insignificant number. It is understood that any compressing, averaging or deletion of the resulting coefficient numbers will generally decrease the accuracy of the transfer function over the full range $V_{min}$ to $V_{max}$.

It is further understood that fourth, fifth or higher degree polynomials could be utilized to establish a transfer function relationship between an input to a CDD and the resulting output brightness of each color. The transfer function will have a larger number of coefficients and may provide a high level of accuracy. The accuracy may be misleading or insignificant depending on various variables such as test equipment accuracy, standardized CDD electronic components, the number of incremental samples taken between $V_{min}$ and $V_{max}$ just to name a few.

By utilizing the transfer function coefficients established for each CDD 10, then each CDD can be standardized to produce a predictable color brightness. That is, if it is known what voltage is required to produce a predetermined color brightness for any color or combination of colors to within approximately ±0.3 foot-lamberts on each color display device, then all color display devices can be significantly standardized to produce substantially similar pictures.

This is an important advancement in color display technology particularly in the area of advertising on the internet. A manufacturer may produce a web site to sell products, for example, clothing, wall paper, tile, paint, fabric, pictures, or other manufactured items. The color of the products may be very important to the buyer. Thus, it would be advantageous to the seller and buyer to know that the color represented on the computer screen is substantially and accurately the same color as to actual product.

In order to provide CDDs that are capable of providing standardized color, the voltage to brightness transfer function of each CDD must be determined at the time the CDD is manufactured. It is understood that the voltage-to-brightness transfer function coefficients are not necessarily the same for each different CDDs even if the CDDs are electronically identical or manufactured next to each other on an assembly line. It is important that the transfer function coefficients be established for each monitor or CDD.

Figure 3:
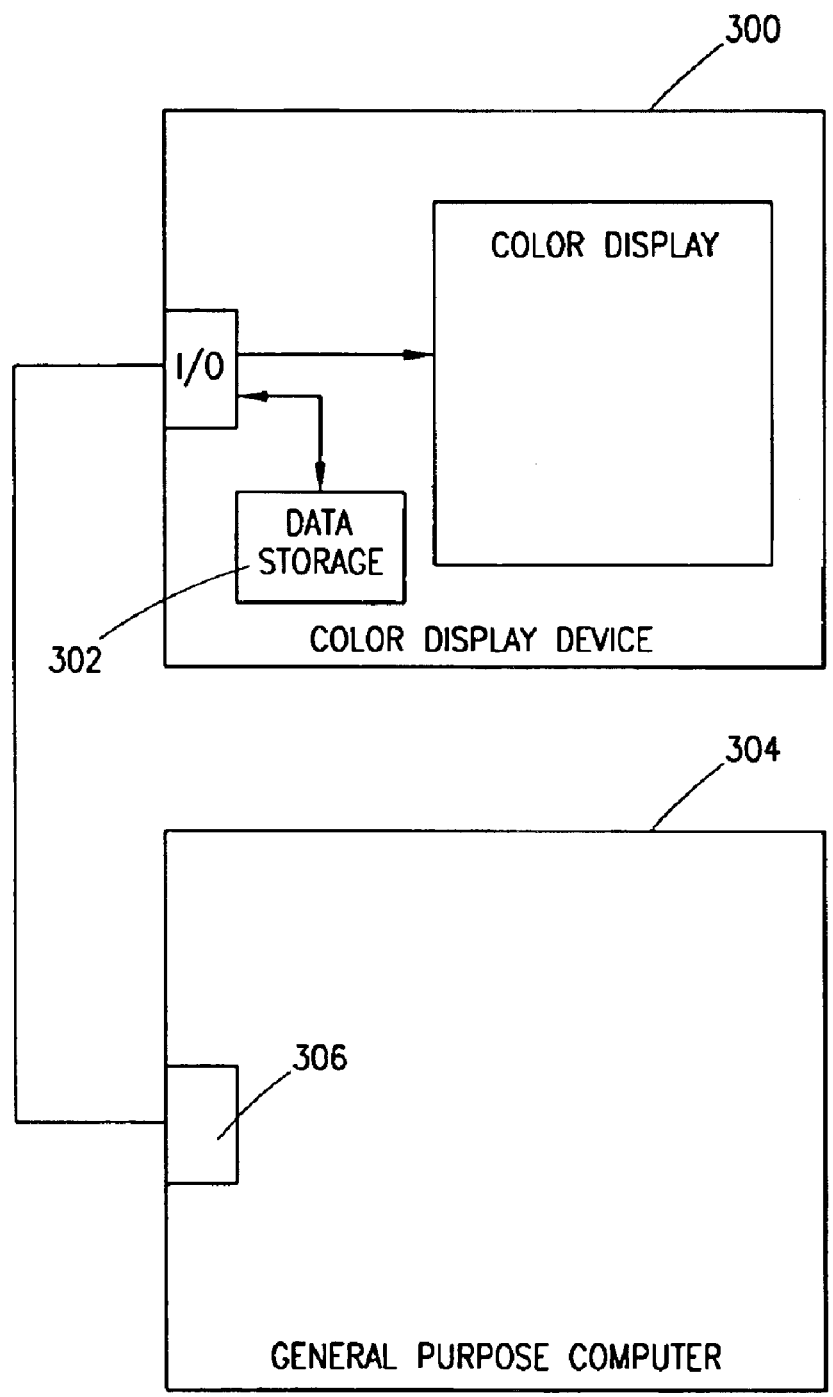
FIG. 3 depicts a computer system that utilizes transfer function data which is stored in a color display monitor.

Referring to FIG. 3, it would be further advantageous for each CDD or monitor 300 to carry a "description of itself" that includes the transfer function coefficients for that CDD in a data storage device 302. The coefficients could be downloaded to a personal computer 304 (laptop computer, general purpose computer) when the CDD 300 is connected thereto, in order to provide the computer's video driver 306 the coefficients to standardize the brightness output of the CDD.

Figure 2:
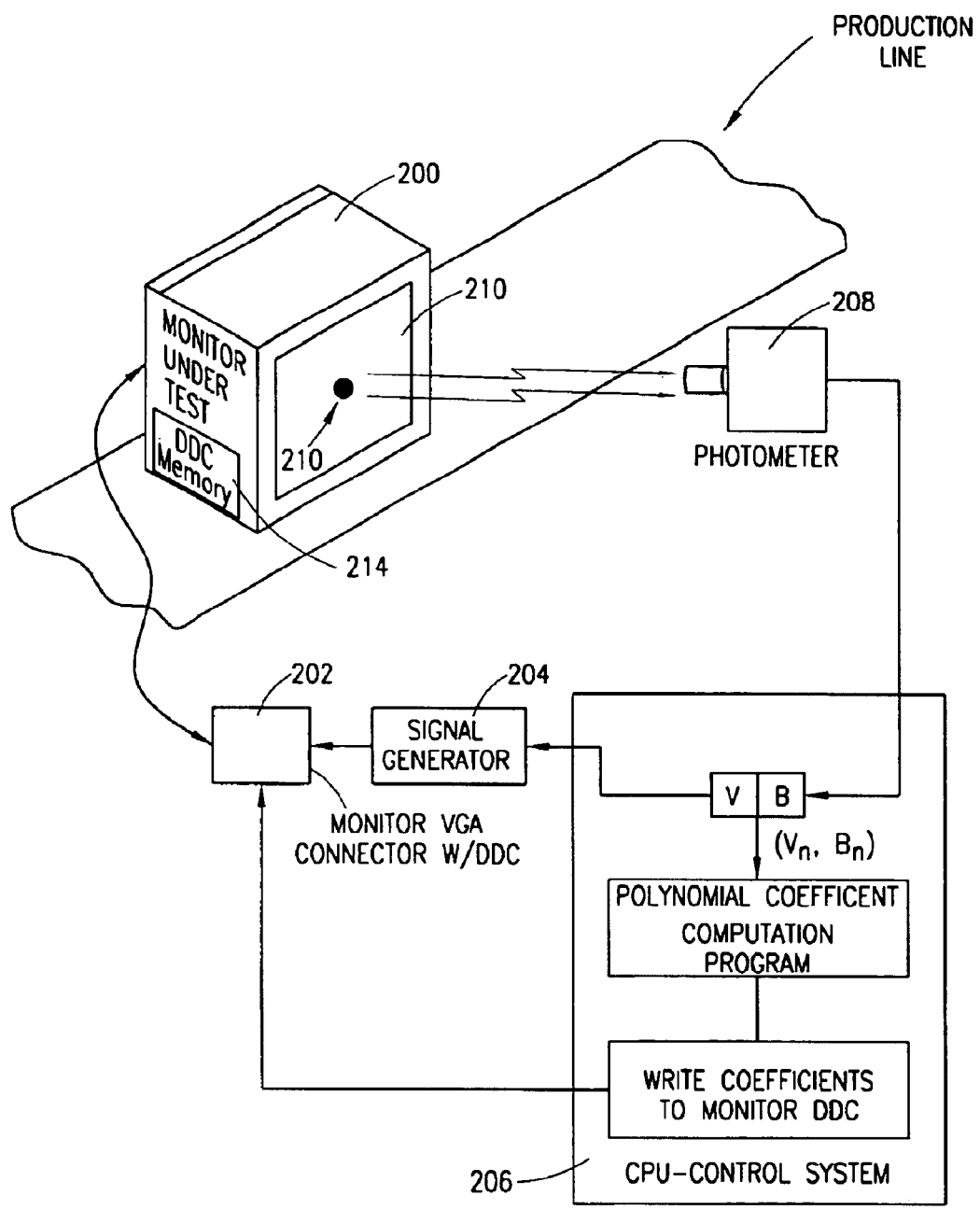
FIG. 2 depicts an exemplary method and apparatus for generating a transfer function that represents the input-output characteristics of a color monitor.

Referring now to FIG. 2, a production method and apparatus for determining the transfer function coefficients of a CDD is shown. A monitor 200 is sitting on a production line and comes to a place on the production line wherein testing of the monitor 200 takes place. The monitor 200 is connected to power and allowed to warm up. The monitor 200 is also connected to a VGA connector 202. It is understood that a specific type of connector is not required, the CDD need only be connected to a means for providing a display signal to the CDD. The VGA connector is connected to a signal generator circuit 204. The signal generator 204 receives an input from a control system 206 which could be, for example, a dedicated CPU or general purpose computer.

A photometer 208, or other device for measuring color brightness, is focused to receive input from a predetermined location(s) on the monitor screen 210. The photometer 208 provides a brightness measurement input to the control system 206.

The control system 206 controls the signal generator to provide incremental voltage or video color (V) steps ranging from a $V_{min}$ to a $V_{max}$ for one of the output colors (red, green or blue). The signal generator 204 provides a pattern and voltage level for the color to the monitor 200 via the VGA connector 202. The resulting pattern 212 displayed on the monitor screen 210 could be a red dot or square comprising a plurality of pixel locations. As the voltage input controlling the pattern is incrementally changed from $V_{min}$ to $V_{max}$ or vice versa, the brightness of the resulting pattern 212 is measured incrementally by the photometer 208. It is understood that the pattern 212 need only be a pattern large enough to be discerned and focused on by the photometer. The patterns shape is not substantially significant. Furthermore, the pattern could be positioned at one or various locations on the screen 210.

As the voltage input increments, it may stop at each increment and wait for the photometer to read the pattern's brightness. The brightness is then recorded by the control system in conjunction with the voltage that caused the brightness. In essence, a set of ordered pairs is generated as data which correlates the voltage required to produce a specific brightness of the specified color. After the voltage to brightness correlation data for a color is recorded, then voltage to brightness correlation data is obtained for the other predetermined colors. It is further understood that the colors do not have to be limited to the red, green, and blue, but could be combinations of each or whatever the basic colors that are combined to create other colors are for the specific CDD. It is further understood that more than one color can be displayed on the screen 210 and be recorded by a plurality of photometers at the same time.

After the control system 206 systematically steps through each voltage, measures the corresponding brightness, and stores the data, it rapidly progresses through the linear algebra equations and solves for the coefficients of the polynomial equations discussed above. Coefficients for a transfer function of each measured color are computed. For example, red, green and blue will each have four coefficients if the control system is solving third order polynomial equations for each color.

The control system 206 then writes the coefficients which are used in the voltage to brightness transfer function to the monitor via the VGA connector. In the exemplary method and apparatus the coefficients are stored in the DDC memory 214 located within the color display device.

DDC memory is not specifically required. The coefficients can be stored in any non-volatile memory or data storage device 214 associated with the monitor 200. The importance is that the coefficients are stored in a memory device associated 214 with the monitor 200 so that the coefficients can be read at a later time and provided to the video driver circuitry or software that provides display signals to the monitor 200.

The monitor 200 is disconnected from the VGA connector 202 and moves down the assembly line with its display characterizing information stored in the DDC memory 214. The next monitor on the assembly line is then moved into position to be tested and measured to determine its voltage to brightness transfer function coefficients.

As a result of the present system and method for measuring and storing voltage to brightness transfer function coefficients in each monitor or CDD as it is manufactured, each monitor can provide its transfer function information to the computer system it is eventually connected to and thereby provide a standardized voltage to brightness compensation. The result being that every monitor will provide a color picture that looks the same as any other monitor equipped with transfer function coefficients that are utilized by a video driver. The input voltage to the monitor can be modified by the video driver circuitry of the attached computer to provide the standardized color brightness. In essence the video driver can modify its output in accordance with the stored coefficients so that the video input to the monitor will result in a standardized color and color brightness output.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A color display system, comprising:
    a color display device that stores color correction data in a memory associated therewith, the color correction data comprising a plurality of coefficients representative of an equation that describes an input-output color characteristic associated with the color display device; and
    a computer system that is adapted to:
        load the color correction data from the color display device; and
        create a video signal based on the color correction data.

2. The color display system set forth in claim 1, wherein the computer system is adapted to send the video signal to the color display device.

3. The color display system set forth in claim 1, wherein the input-output color characteristic comprises a signal input-to-first color output relationship of the color display device.

4. The color display system set forth in claim 1, wherein the equation comprises a polynomial equation.

5. The color display system set forth in claim 1, wherein the equation comprises a third order polynomial equation which predicts the brightness of the first color to within 0.3 foot-lamberts for each input signal for the color display device.

6. The color display system set forth in claim 1, wherein the Color display device can be at least one of a VGA monitor, a MultiSync monitor, a flat panel NCD display, a flat panel SPU display, a flat panel LCD display, a reflective LCD display, and a FED display device.

7. The color display system set forth in claim 1, wherein the standard memory comprises a display data channel ("DDC") memory.

8. A color display system, comprising:
    a color display device that stores color correction data in a memory associated therewith, the color correction data comprising a plurality of coefficients representative of an equation that describes an input-output color characteristic associated with the color display device; and
    a computer system that is adapted to:
        load the color correction data from the color display device; and
        create a video signal based on the color correction data.

9. The color display system set forth in claim 8, wherein the computer system is adapted to send the video signal to the color display device.

10. The color display system set forth in claim 8, wherein the input-output color characteristic comprises a signal input-to-first color output relationship of the color display device.

11. The color display system set forth in claim 8, wherein the equation comprises a polynomial equation.

12. The color display system set forth in claim 8, wherein the equation comprises a third order polynomial equation which predicts the brightness of the first color to within 0.3 foot-lamberts for each input signal for the color display device.

13. The color display system set forth in claim 8, wherein the color display device can be at least one of a VGA monitor, a MultiSync monitor, a flat panel NCD display, a flat panel SPU display, a flat panel LCD display, a reflective LCD display, and a FED display device.

* * * * *